No. 614,671. Patented Nov. 22, 1898.
W. M. STEVENSON.
CULTIVATOR.
(Application filed June 18, 1898.)
(No Model.)
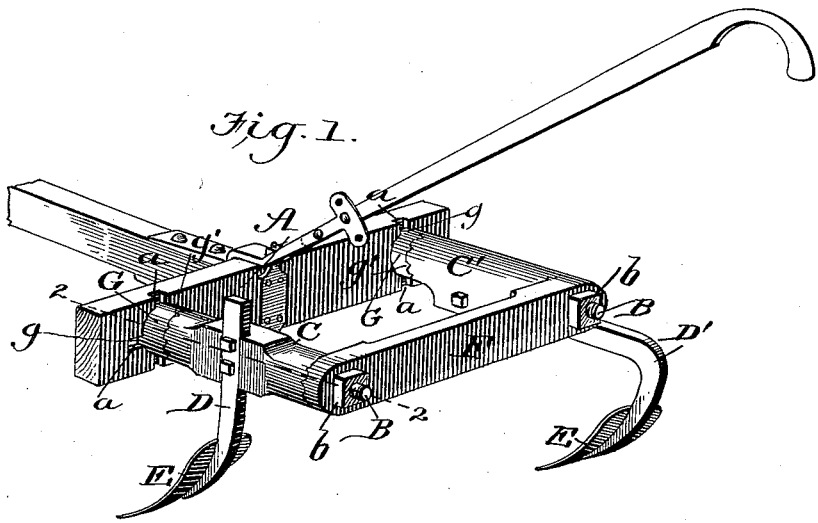
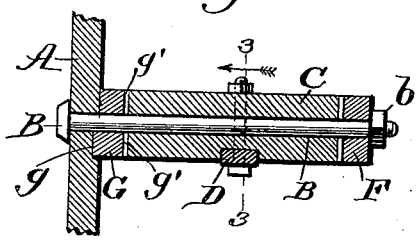
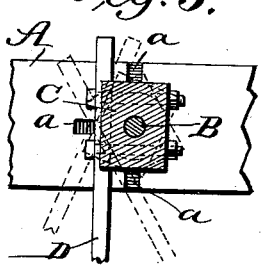
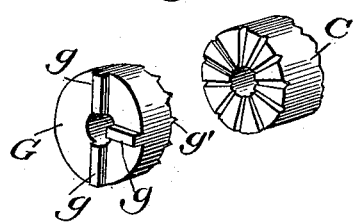
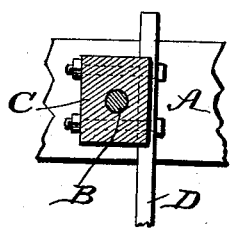
WITNESSES:
Jos. A. Ryan
Amos W Hart
INVENTOR
William M. Stevenson
BY Munn & Co.
ATTORNEYS.
THE NORRIS PETERS CO., PHOTO-LITHO., WASHINGTON, D. C.

UNITED STATES PATENT OFFICE.

WILLIAM M. STEVENSON, OF HONEY GROVE, TEXAS.

CULTIVATOR.

SPECIFICATION forming part of Letters Patent No. 614,671, dated November 22, 1898.

Application filed June 18, 1898. Serial No. 683,830. (No model.)

*To all whom it may concern:*

Be it known that I, WILLIAM M. STEVENSON, a citizen of the United States, residing at Honey Grove, in the county of Fannin and State of Texas, have invented an Improvement in Cultivators, of which the following is a specification.

My invention is an improvement in cultivator "saddles" or attachments for the beams thereof, which consist of devices carrying "feet" or standards to which shovels, plows proper, or other analogous cultivating devices are secured.

The chief characteristic of my improvement is the rotatable sleeves or cylinders to which the shovel or plow standards are attached, so that the latter may be adjusted in different positions or angles, as required, to cause such shovels or plows to work nearer each other or farther apart or be thrown out of work altogether. The said sleeves or cylinders are mounted on horizontal axes and located in any position to which they may be adjusted by means of screw-clamps, as hereinafter described.

In the accompanying drawings, Figure 1 is a perspective view of my invention. Fig. 2 is a longitudinal section on line 2 2 of Fig. 1. Fig. 3 is a cross-section on line 3 3 of Fig. 2. Fig. 4 is a perspective view showing the construction of the locking devices. Fig. 5 is a detail cross-section illustrating the reversal of one of the sleeves or cylinders to which a standard or foot is attached.

A indicates a cross-bar, which in practice is attached to a cultivator-beam in any approved manner. Iron or steel rods B pass transversely through said bar A and are arranged parallel horizontally and at about such distance apart as the usual space between rows of corn, potatoes, or cotton-plants. On these rods B are mounted rotatable iron sleeves or cylinders C and C', and to the latter are secured the respective feet or standards D D', carrying shovels, plows, or other cultivating devices E.

A short cross-bar F, Fig. 1, connects the rear ends of the rods B, and nuts $b$ are screwed on the latter, as shown. The rear side of bar A has a series of grooves $a$, that radiate from the holes through which the rods pass. A disk or cylindrical washer G is mounted on each of the rods B adjacent to the bar A and provided on its front face with radial ribs $g$, Fig. 4, that fit in the aforesaid grooves $a$ in bar A, whereby the disk is prevented from rotating. The rear side of each disk or washer G is also provided with small radial ribs $g'$, which engage corresponding grooves in the front end of the sleeves or cylinders C. It is thus apparent that when the nuts $b$ are screwed home, as shown in Figs. 1 and 2, the sleeves C are held in firm contact with the disks G and the latter with the bar A, so that both sleeves and disks are prevented from rotating. The rear ends of the sleeves C are also provided with ribs adapted to lock with grooves in the cross-bar F. The straight foot or standard D is held detachably in a vertical transverse groove in the side of the sleeve C by means of two screw-bolts. The curved foot or standard D' is similarly bolted to the side of the sleeve C'.

It will be apparent that by the above-described construction and combination of parts upon loosening the nuts the sleeves or cylinders C may be rotated as required to set the shovels or plow-standards D D' at a lateral inclination, as shown by dotted lines, Fig. 3. Thus in sowing grain the standards and shovels may be both inclined in the same direction, so as to throw all the dirt one way. It is further apparent that the sleeves C may be rotated to such position as to throw the standards D D' to a horizontal position, as may be required when the machine is being moved from place to place on the farm, so that the plows or shovels E offer no obstruction to travel. It may also be seen that by removing the securing-bolts the standard D may be removed, and the cylinder C being rotated half-way the same standard may be applied on the opposite or inner side of said cylinder, as shown in Fig. 5, thus bringing the standards and shovels nearer each other, as may be required for cultivating certain crops.

The front ends of the sleeves or cylinders C C' may be engaged directly with the bar A by means of ribs and grooves without the intervention of the disks or washers G.

What I claim is—

1. In a cultivator, an attachment comprising one or more rotatable sleeves or cylinders arranged horizontally in line with the direction of motion of the cultivator, standards or feet, secured to the sides thereof and carrying shovels or other cultivating devices, and means for clamping the said sleeves in any adjustment, substantially as shown and described.

2. In a cultivator, an attachment comprising one or more rotatable sleeves or cylinders, arranged horizontally in line with the direction of motion of the cultivator, axial rods or shafts on which said sleeves are mounted, and adjustable clamps for holding the sleeves in any rotary adjustment, substantially as shown and described.

3. In a cultivator, the combination with cross-bars arranged horizontally, of one or more rotatable sleeves or cylinders arranged parallel between said bars and at right angles thereto, rods passing through said bars and serving as axes for the sleeves, standards or "feet" attached to the side of said sleeves, ribs and grooves being provided for locking the sleeves, and nuts applied to the screw-threaded ends of the rods or shafts, as shown and described.

4. In a cultivator, the combination with cross-bars and rods or shafts fixed therein at right angles to them, ribbed and grooved disks or washers applied to said bars and rods, sleeves or cylinders mounted rotatably on the rods, standards secured to the sleeves and carrying cultivating devices, and nuts applied to the rear screw-threaded ends of the rods, and abutting the rear ends of the sleeves as shown and described.

5. In a cultivator, the combination with cross-bars having grooves in their inner sides, rods held in said bars and arranged parallel horizontally, ribbed and grooved disks or washers mounted on the rods and engaging said bars, sleeves or cylinders mounted rotatably on said rods and having grooves for engaging said disks, and nuts applied to the rods, as shown and described.

6. In a cultivator, the combination with a supporting cross-bar, a rotatable sleeve or cylinder mounted thereon, and having a vertical groove in one of its sides, and a plow "foot" or standard adapted to fit in said groove and for reversal therein as shown and described.

WILLIAM M. STEVENSON.

Witnesses:
J. D. BEDFORD,
E. S. WOOD.